(12) United States Patent
Niedzwiecki

(10) Patent No.: US 8,419,141 B2
(45) Date of Patent: Apr. 16, 2013

(54) SWITCHGEAR DOOR LATCHING SYSTEM

(75) Inventor: Michael L. Niedzwiecki, Omaha, NE (US)

(73) Assignee: Eaton Corporation, Cleveland, OH (US)

( * ) Notice: Subject to any disclaimer, the term of this patent is extended or adjusted under 35 U.S.C. 154(b) by 261 days.

(21) Appl. No.: 12/931,244

(22) Filed: Jan. 27, 2011

(65) Prior Publication Data

US 2012/0194044 A1 Aug. 2, 2012

(51) Int. Cl.
*E05B 65/46* (2006.01)

(52) U.S. Cl.
USPC ....................................... 312/216; 200/50.15

(58) Field of Classification Search .................... 292/32, 292/35–36, 41–42, 437, 158, 161–162, 139, 292/143, 145–146, 262, 302, DIG. 68; 312/215–218, 222; 200/43.16, 50.01, 50.02, 200/50.1, 50.15
See application file for complete search history.

(56) References Cited

U.S. PATENT DOCUMENTS

| | | | |
|---|---|---|---|
| 2,946,865 A | 10/1958 | Thomas | |
| 3,055,996 A | 10/1959 | Beebe et al. | |
| 3,059,072 A | 10/1962 | Mekelburg et al. | |
| 3,207,880 A | 9/1965 | Mekelburg | |
| 3,229,056 A | 1/1966 | Turnbull | |
| 4,194,100 A | 3/1980 | Cox et al. | |
| 4,405,844 A | 9/1983 | Dizon et al. | |
| 4,769,739 A | 9/1988 | De Bruin | |
| 6,490,895 B1 * | 12/2002 | Weinerman et al. | 70/208 |
| 6,681,604 B1 * | 1/2004 | Samsel | 70/78 |
| 6,746,092 B2 * | 6/2004 | Leccia et al. | 312/222 |
| 2009/0212022 A1 | 8/2009 | Josten et al. | |

\* cited by examiner

*Primary Examiner* — James O Hansen
*Assistant Examiner* — Matthew Ing
(74) *Attorney, Agent, or Firm* — Eckert Seamans Cherin & Mellott, LLC; Kirk D. Houser

(57) ABSTRACT

A switchgear door latch system is provided which prevents a door of a switchgear enclosure from opening should an arc-fault explosion occur within the enclosure. The door of the enclosure is latched from the exterior side of the door rather than on the inside of the door as is true in the prior at designs. All of the components of the latch system are located at the exterior side of the enclosure which facilitates repair of the same without cutting a hole in the door.

4 Claims, 10 Drawing Sheets

SWITCHGEAR DOOR LATCHING SYSTEM

BACKGROUND OF THE INVENTION

1. Field of the Invention

This invention relates to a door latch system for a door of a switchgear enclosure and more particularly to a door latch system for a door of a switchgear enclosure wherein all the components of the door latch system are located outside the door for ease of repair.

2. Description of the Related Art

The terms switchgear and switchboard are general terms which cover metal enclosures which house switching and interrupting devices such as fuses, circuit breakers, relays, inner connections and supporting structures, including assemblies of these devices with associated fuses, interconnections and support structures used for the distribution of electric power.

Most switchgears presently produced include an exhaust system for venting gas and debris particles generated by an electric arc under arc-fault conditions. During an arc-fault explosion, the temperature and pressure inside the switchgear increase very rapidly and the rapid pressure build-up can damage the switchgear and its components. Exhaust systems such as that disclosed in US Published Patent Applications US 2009/0212022 and 2010/0258532 are designed to vent the gas and debris particles from the switchgear enclosure during an arc-fault explosion. Even though the venting systems of the prior art perform generally satisfactorily, the doors of the switchgear enclosure are subjected to large internal pressures which may cause the doors to "blow" open thereby subjecting workers in the area to possible injury.

Door latch systems have been previously provided in an attempt to prevent the enclosure doors from opening during an arc-fault explosion. However, the components of the prior art door latch systems are located within the door or within the enclosure at the inside surface of the door. If one of the components of the prior art door latch system should fail, it is impossible, or very difficult, to open the door to gain access to the failed component. In such a situation, it may be necessary to cut a large hole in the door to gain access to the failed component so that the door may be opened to perform the necessary repairs on the door.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A door latch system is provided for the doors of a switchgear enclosure. The doors of the switchgear may be of the walk-in type or the non-walk-in type. The doors of the switchgear enclosure of the non-walk-in type will usually be located in the front panel of the enclosure. If the door or doors are of the walk-in type, the door or doors will usually be located in the rear panel of the enclosure. In the present invention, the only difference between the door latch systems utilized with the walk-in type and the non-walk-in type doors is that in the walk-in type door latch system, a door jamb may be bolted to the rear panel which extends around the door opening.

This summary will be directed to the door latch system for the walk-in type door. A door opening is provided in the rear panel of the switchgear enclosure which has an upper edge, a lower edge, a first side edge and a second side edge. An optional jamb is welded to the exterior surface of the rear panel around the door opening and includes an upper jamb member, a lower jamb member, a first side jamb member and a second side jamb member. A door is provided which includes an upper end, a lower end, a first side, a second side, an inner surface and an outer surface. The door in the rear panel will be described as if the optional jamb is not utilized.

The first side of the door is hingedly secured to the rear panel adjacent the first side edge of the door opening, about a vertical axis, by a plurality of vertically spaced-apart first hinges. A plurality of externally threaded studs are secured to the rear panel adjacent the second edge of the door opening and extend outwardly therefrom in a vertically spaced-apart manner. A plurality of second hinges are provided each of which includes a first part and a second part which are pivotally secured together by a vertically disposed pivot pin. The first part of each of the second hinges is secured to the outer end of one of the studs which extend from the rear panel adjacent the second side edge of the door opening. The second part of each of the second hinges is secured to an elongated and vertically disposed angle member having first and second walls which are transversely disposed with respect to one another. The second part of each of the second hinges is secured to the first wall of the angle member. The angle member is selectively movable between latched and unlatched positions.

A plurality of vertically spaced-apart door latches, having inner and outer ends are secured to the angle member for movement therewith and extend horizontally therefrom. At least one of the door latches has a handle associated therewith. Each of the door latches has a latch pin opening formed therein outwardly of the inner end thereof.

A vertically-disposed and generally channel-shaped door latch housing is secured to the outside surface of the door adjacent the second side thereof. The housing defines an interior compartment having upper and lower ends. A latch handle is pivotally mounted on the housing which is movable between latched and unlatched positions. The latch handle includes a shaft which extends into the interior compartment of the housing. The housing has a plurality of vertically spaced-apart and horizontally disposed slots formed therein.

A plurality of first latch plate assemblies are secured to the housing in the interior compartment thereof in a vertically spaced-apart manner between the shaft of the latch handle and the upper end of the housing. Each of the first latch plate assemblies includes vertically spaced-apart and horizontally disposed upper and lower latch plates. Each of the upper and lower latch plates of the first latch plate assemblies have first and second openings formed therein.

A plurality of second latch plate assemblies are secured to the housing in the interior compartment thereof in a vertically spaced-apart manner between the shaft of the latch handle and the lower end of the housing. Each of the second latch plate assemblies includes vertically spaced-apart and horizontally disposed upper and lower latch plates. Each of the upper and lower latch plates of the second latch plate assemblies have first and second openings formed therein.

A first elongated actuator rod, having upper and lower ends, has its lower end coupled to the shaft of the latch handle and extends upwardly therefrom through the first openings in the upper and lower latch plates of the first latch plate assemblies. A second elongated actuator rod, having upper and lower ends, has its upper end coupled to the shaft of the latch handle and extends downwardly therefrom through the first openings in the upper and lower latch plates of the second latch plate assemblies. The pivotal movement of the latch handle from its unlatched position to its latched position causes the first actuator rod to move upwardly and causes the second actuator rod to move downwardly. The pivotal movement of the latch handle from its latched position to its unlatched position causes the first actuator rod to move downwardly and causes the second actuator rod to move upwardly.

A plurality of first latch pin assemblies are mounted on the first actuator rod in a vertically spaced-apart manner with each of the first latch pin assemblies having a latch pin extending vertically upwardly therefrom. The movement of the latch handle from its unlatched position to its latched position causes the latch pins of the first latch pin assemblies to move upwardly with the first actuator rod so as to be received by the second openings in the upper and lower latch plates of the first latch plate assemblies.

A plurality of second latch pin assemblies are mounted on the second actuator rod in a vertically spaced-apart manner with each of the second latch pin assemblies having a latch pin extending vertically downwardly therefrom. The movement of the latch handle from its unlatched position to its latched position causes the latch pins of the second latch pin assemblies to move downwardly with the second actuator rod so as to be received by the second openings in the upper and lower latch plates of the second latch plate assemblies.

The door may be moved to its closed position when the angle member is in its unlatched position. The latch handle is then moved to its unlatched position if not already done so. The angle member is then moved to its latched position which causes the latches secured thereto to move into the interior compartment by way of the slots formed in the housing. The latch pin openings of the latches are then vertically aligned with the latch pins of the first and second latch pin assemblies. At that time, the second wall of the angle member is pressed against the outside surface of the door. The latch handle is then moved to its latched position which causes the latch pins to be moved into the second openings of the upper and lower latch plates of the first and second latch plate assemblies to securely latch the door in its closed and latched position.

During use, if any of the components of the door latching system should fail and require repair while the door is closed, the components are easily reached since all components are located at the outer side of the door.

It is a principal object of the invention to provide an improved switchgear door latch system.

A further object of the invention is to provide a switchgear door latching system which locks the door of the switchgear enclosure from the outer side thereof.

A further object of the invention is to provide a switchgear door latch system wherein all of the components of the system are located at the outer side of the door.

A further object of the invention is to provide a switchgear door latch system which will prevent the door of the switchgear enclosure from opening during an arc-fault explosion.

A further object of the invention is to provide a switchgear door latch system which may be used with practically any size door.

A further object of the invention is to provide a switchgear door latch system which is durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
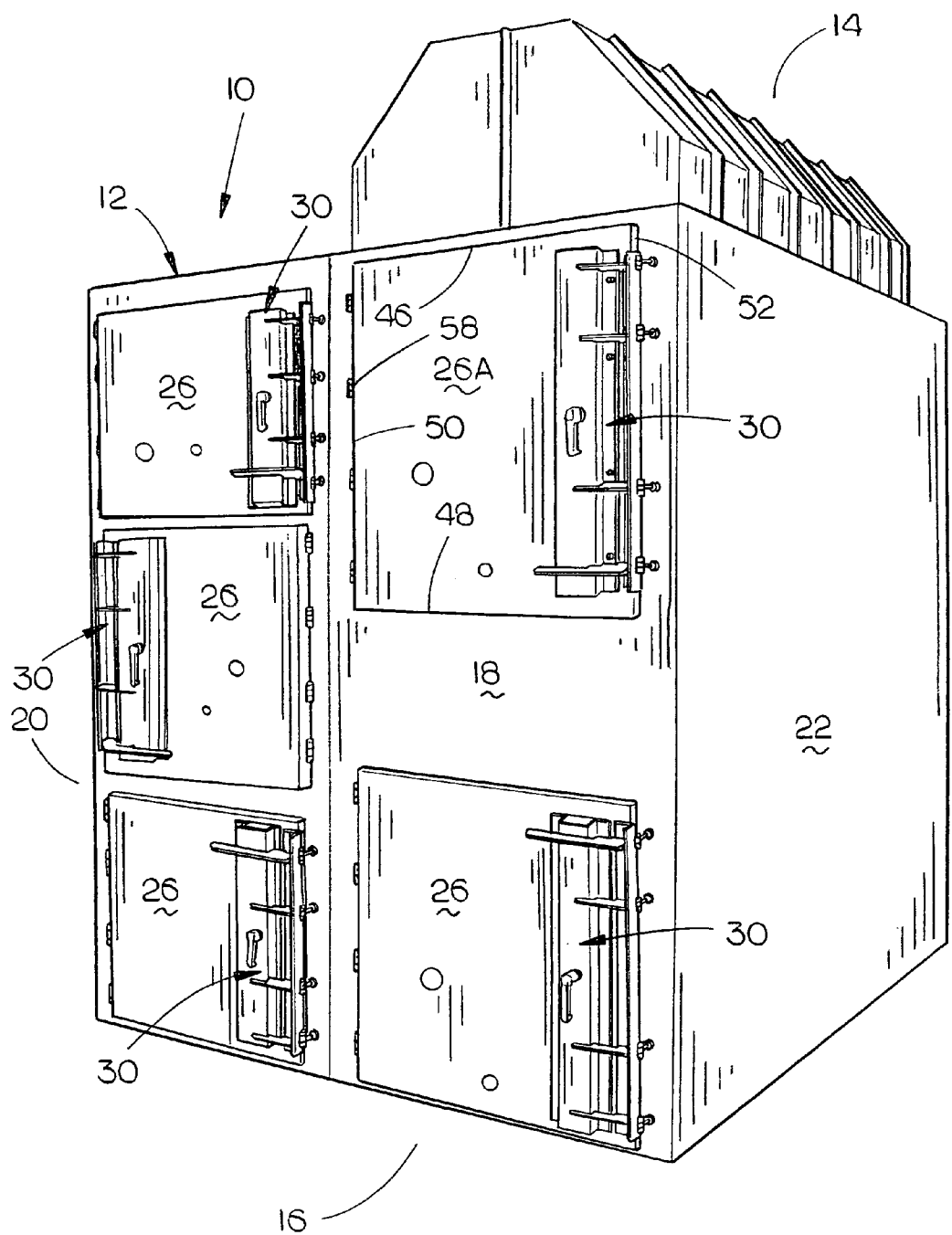
FIG. 1 is a front perspective view of a switchgear enclosure.

Embodiments are described more fully below with reference to the accompanying figures, which form a part thereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional switchgear including an enclosure 12 having an upper end 14, lower end 16, front panel 18, side panels 20 and 22, and rear panel 24. The numeral 26 refers to doors of non-walk-in type which are normally hingedly mounted on the front panel 18 and which may have various dimensions. Each of the doors 26 extend over a door opening 27 formed in front panel 18. The numeral 28 refers to a door of the walk-in type which is normally utilized on the rear panel 24 to close the door opening formed therein. Each of the doors 26 and 28 have the door latch system of this invention associated therewith which is referred to by the reference numeral 30. As seen in the drawings, the doors 26 may have the door latch system mounted at either the right side of the door or the left side of the door opposite to the supporting hinges of the door. For illustration purposes, the door 26A at the upper right side of front panel 18 will be described in detail.

Figure 2:
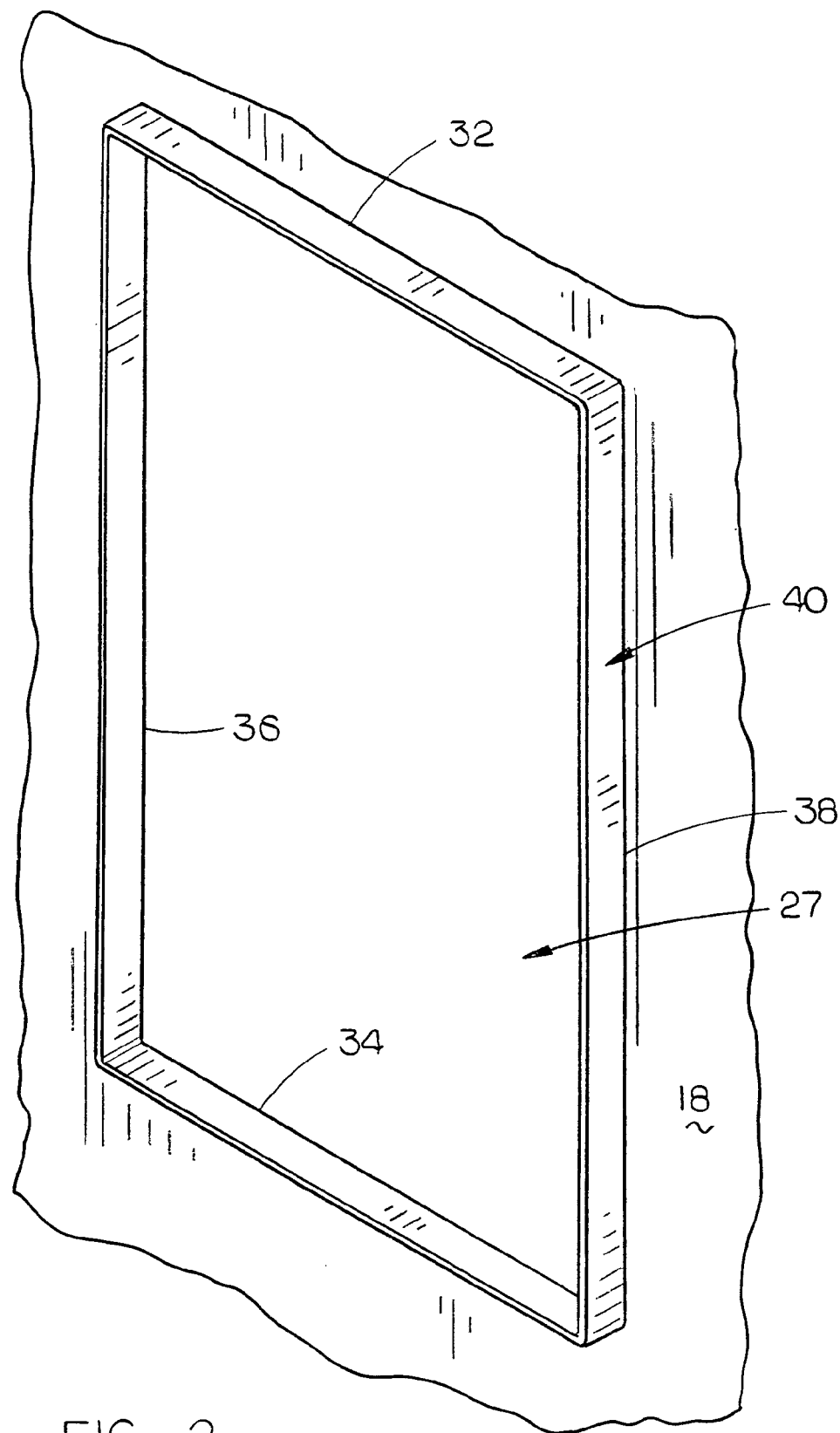
FIG. 2 is a perspective view of a support which extends around the door opening.
Figure 3:
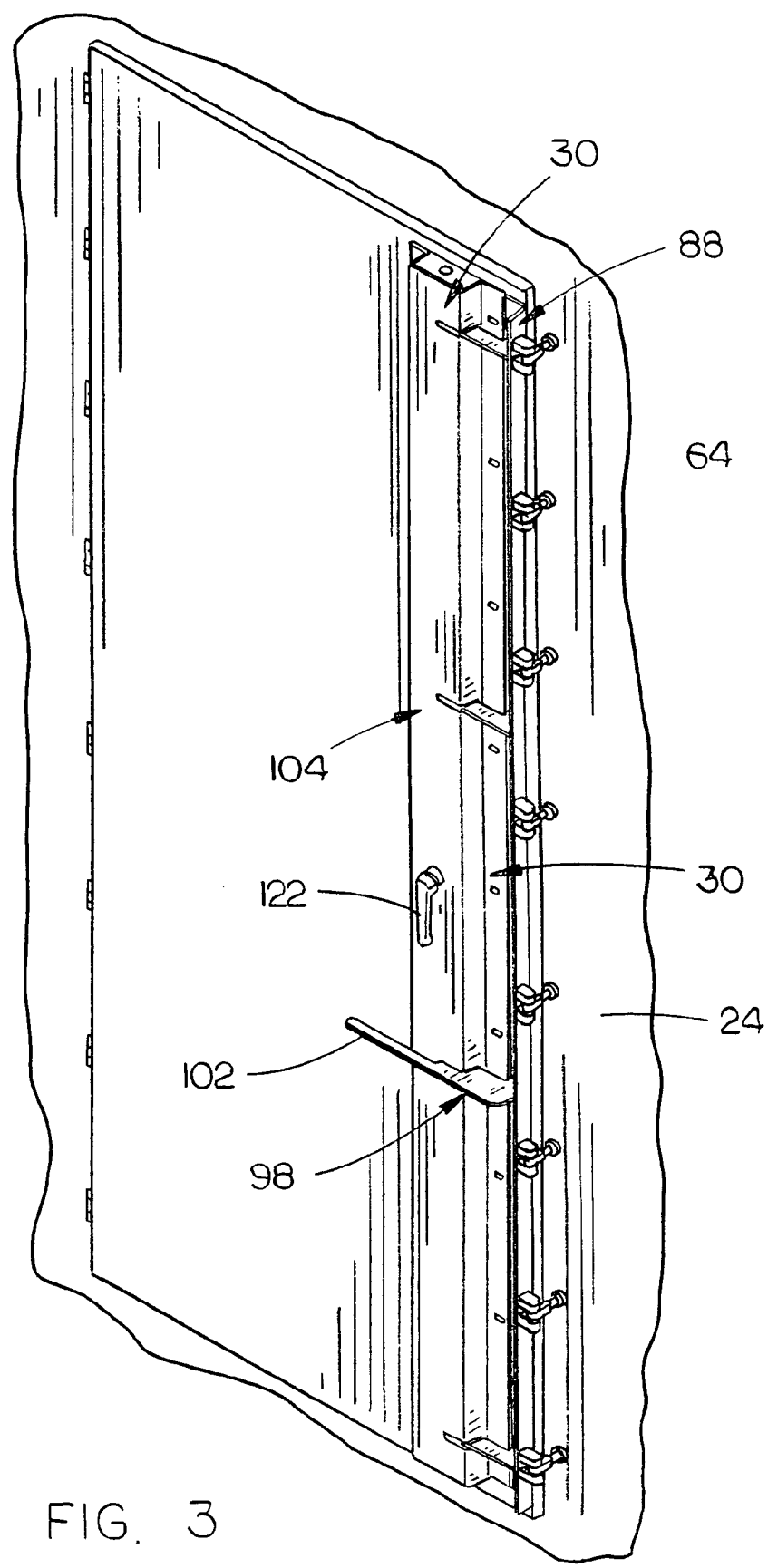
FIG. 3 is a perspective view of the door latch system of this invention associated with a door in the rear panel of the switchgear enclosure.
Figure 4:
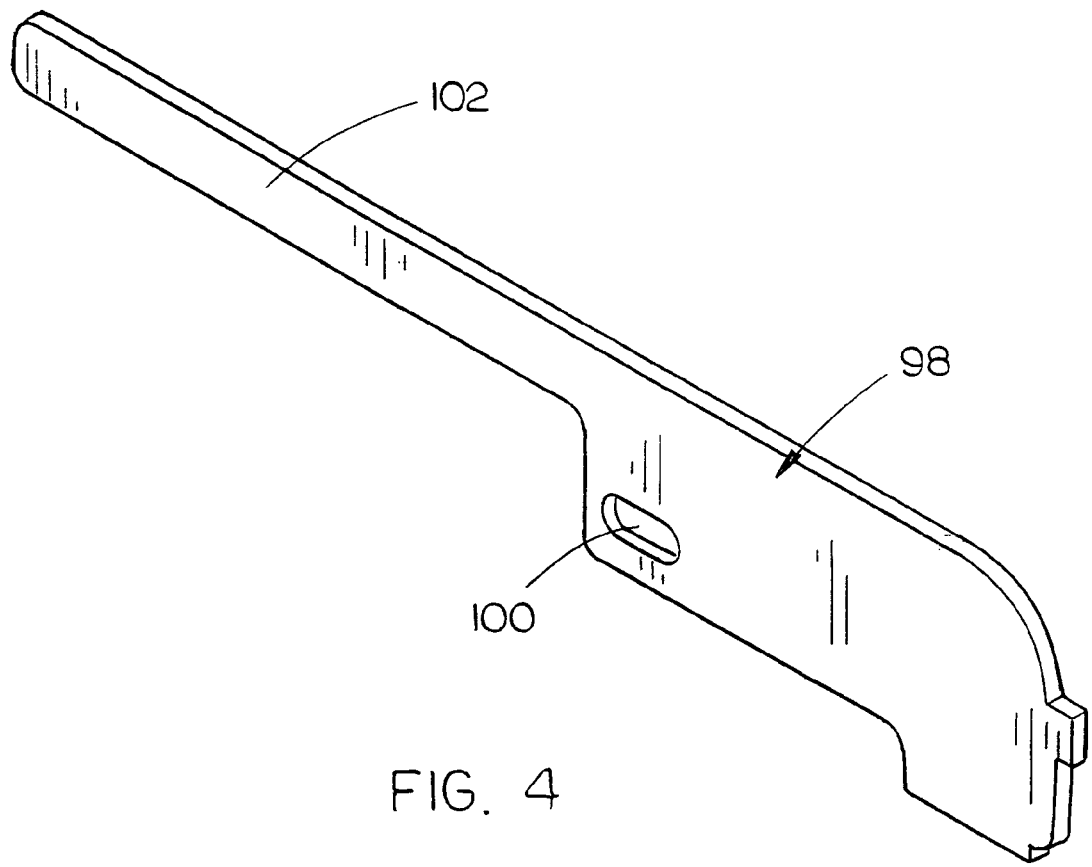
FIG. 4 is a perspective view of one of the latches of this invention which has a handle associated therewith.
Figure 5:
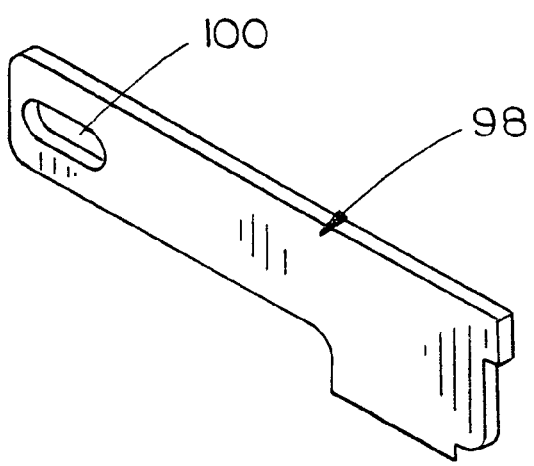
FIG. 5 is a perspective view of a latch utilized in the system.
Figure 6:
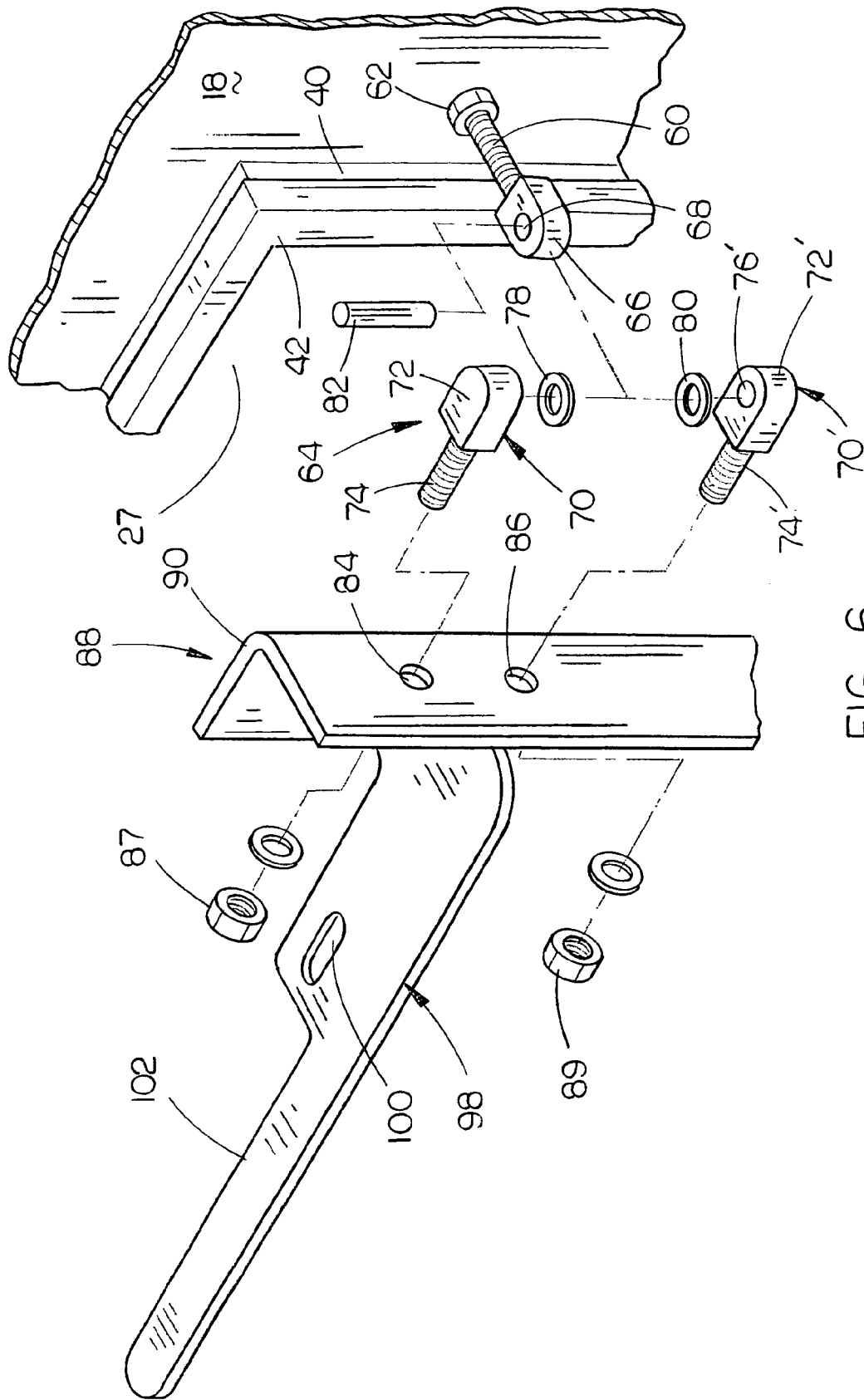
FIG. 6 is a partial exploded perspective view of a portion of the door latch system.

For purposes of description, the door opening 27, which is closed by door 26A, will be described as having an upper edge 32, lower edge 34, first side edge 36 and second side edge 38. Preferably, a metal support or lip 40 extends from panel 18 around door opening 27 as seen in FIG. 2. A resilient seal 42 is mounted on the lip 40 as seen in FIG. 11 and extends completely therearound.

Figure 11:
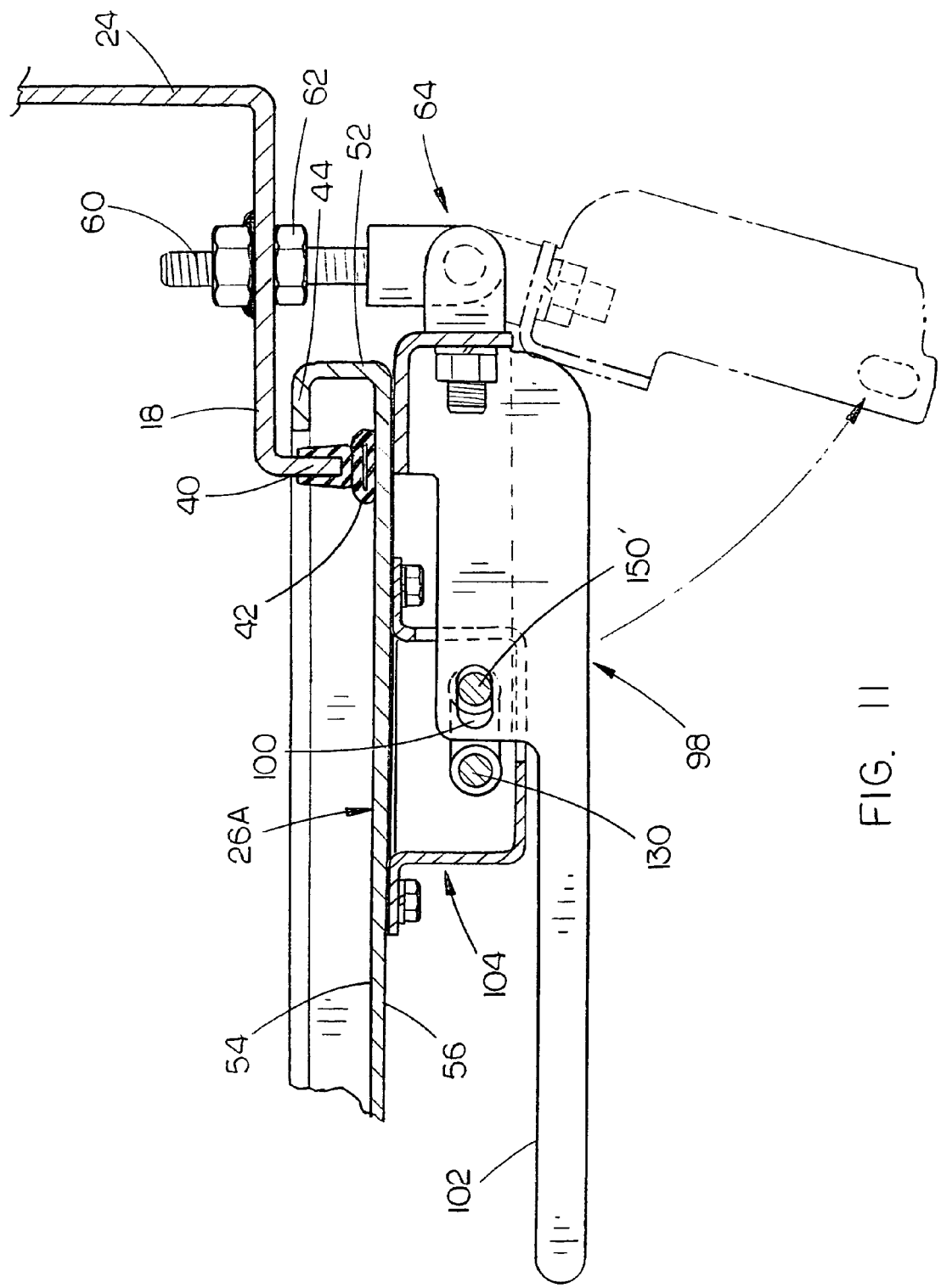
FIG. 11 is a partial sectional view illustrating the manner in which the door latch system functions.

Preferably, the upper, lower and side edges of door 26A are provided with an inwardly directed flange 44 as seen in FIG. 11. For purposes of description, the doors 26 will be described as having an upper end 46, lower end 48, first side 50, second side 52, inner surface 54 and outer surface 56.

Door 26 is hingedly secured at its first side 50 to the outer surface 56 thereof by a plurality of vertically spaced-apart hinges 58. The hinges 58 have one part thereof screwed or bolted to panel 18 and the other part thereof screwed or bolted to door 26A at side 50 thereof about vertical axes in conventional fashion. The doors 26 are movable between open and closed positions.

A plurality of threaded studs 60 are secured to and extend from panel 18 in a vertically spaced and horizontally disposed manner and have lock nuts 62 threadably mounted thereon. The numeral 64 refers to a hinge which is secured to each of the studs 60. Each of the hinges 64 include a bearing-like part 66 which is threadably secured to the outer end of the associated stud 60 and has a vertically disposed opening 68 extending therethrough. Hinge 64 also includes a part 70 having a head 72 and a stud 74 extending therefrom. Head 72 has an opening extending upwardly thereinto from the lower side thereof. Hinge 64 further includes a part 70' which is identical to part 70. Part 70' includes a head 72' and a stud 74'. Head 70' has an opening 76' formed therein which partially extends into head 72'. Parts 70 and 70' are identical but are reversed with respect to one another. A washer 78 is positioned on the upper side of part 66 of said washer 80 and is positioned at the underside of part 66. Pivot or hinge pin 82 is positioned in opening 68 of part 66. Part 70 is positioned so that the upper end of hinge 82 is rotatably received by the opening in the underside of head 72 of part 70. Part 70' is positioned so that the lower end of hinge pin 82 is rotatably received by openings 76' in head 72' of part 70'. The parts of the hinges 64 are held together by the fact that the studs 74 and 74' are received by openings 84 and 86 formed in an elongated angle member 88 and held therein by nuts 87 and 89 respectively. Angle member 88 will be described as having an upper end 90 and a lower end 92 with transversely disposed walls 94 and 96. A plurality of horizontally disposed latches 98 are secured to angle member 88 by welding or the like in a vertically spaced-apart manner. Each of the latches 98 have an elongated latch pin opening 100 formed therein. One of the latches 98 has a handle 102 extending therefrom.

Figure 7:
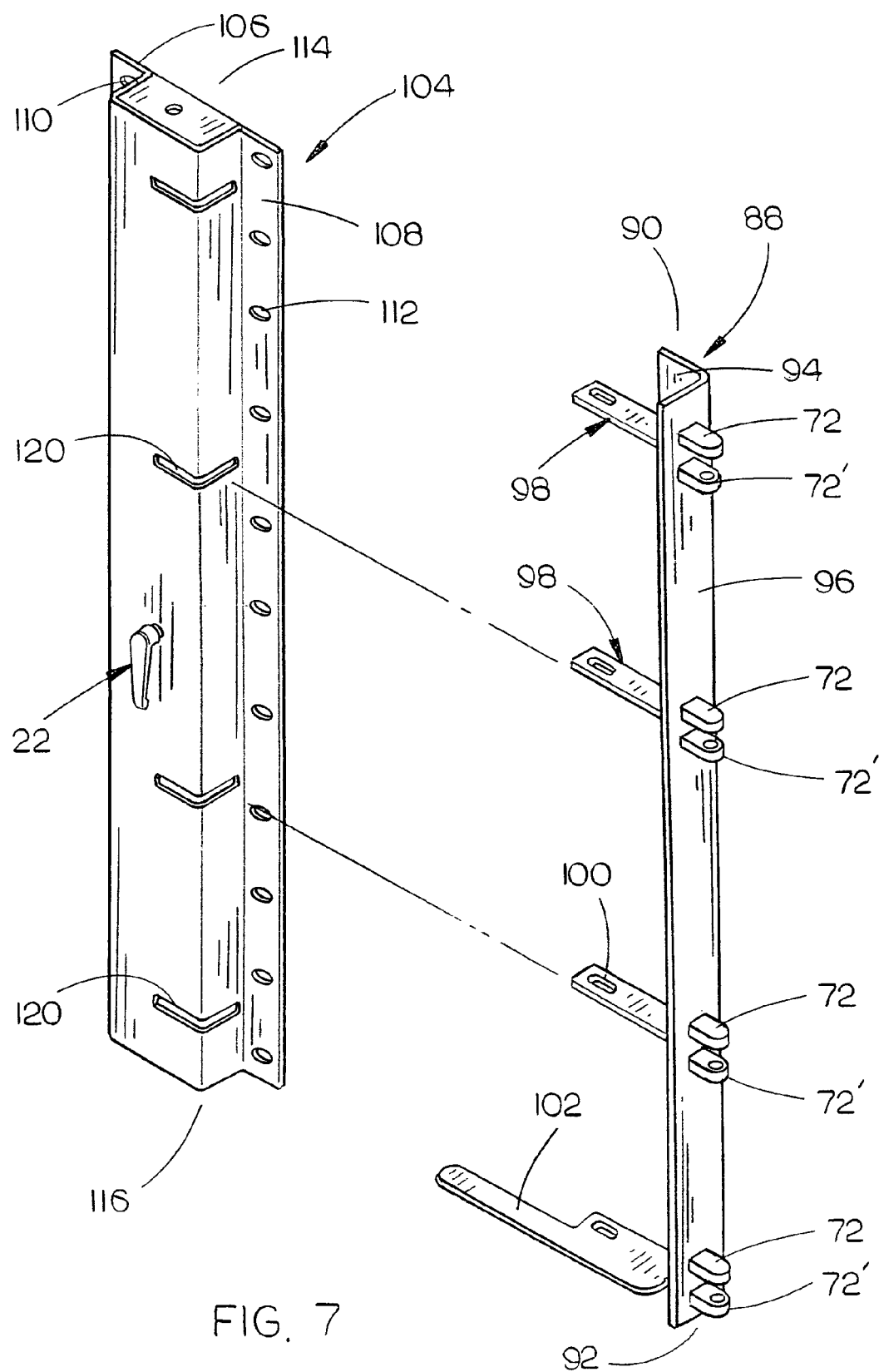
FIG. 7 is a perspective view of the door latch system.
Figure 8:
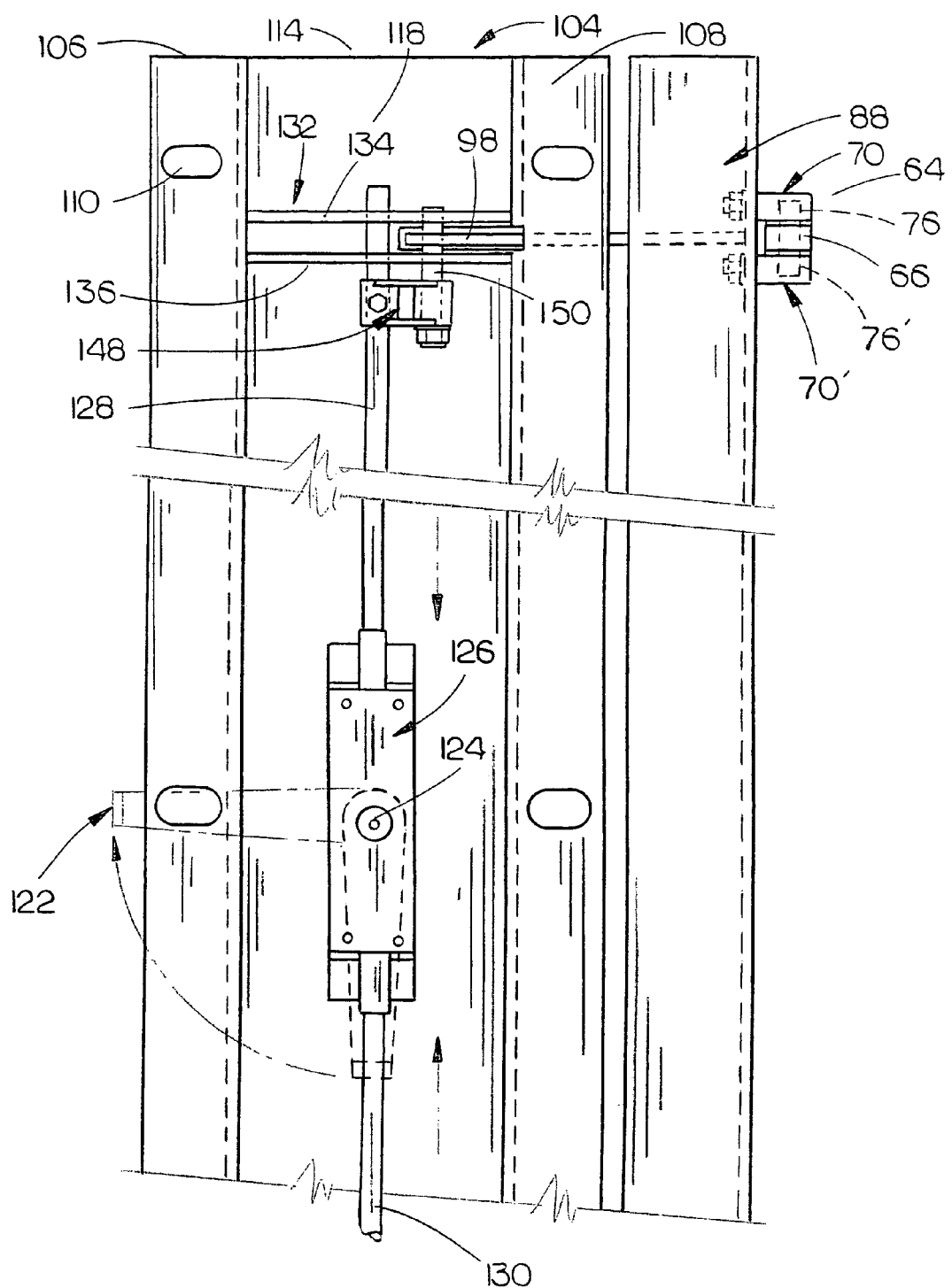
FIG. 8 is a partial elevational view of the inside of the housing portion of the door latch system and a portion of the latching mechanism therein.

The numeral 104 refers to a channel-shaped latch housing having flanges 106 and 108 extending therefrom which have vertically spaced-apart openings 110 and 112 formed therein respectively. For purposes of description, housing 104 will be described as having an upper end 114 and a lower end 116. Housing 104 defines an interior compartment 118 at its inner side. A plurality of vertically spaced-apart and horizontally disposed slots 120 are formed in housing 120 as seen in FIG. 7 which are adapted to receive the latches 98. The handle 102 is not received by a slot 120.

A latch handle 122 is rotatably mounted on housing between latched and unlatched positions and has a shaft 124 secured thereto which extends inwardly into compartment 118 of housing 104. Shaft 124 is coupled to a conventional crank mechanism 126. The lower end of an elongated actuator rod 128 is coupled to crank mechanism 126 and extends upwardly therefrom in compartment 118. The upper end of an elongated actuator rod 130 is coupled to crank mechanism 126 and extends downwardly therefrom in compartment 118. When latch handle 122 is moved from its unlatched position to its latched position, crank mechanism 126 causes actuator rod 128 to move upwardly and causes actuator rod 130 to move downwardly. Conversely, when latch handle 122 is moved from its latched position to its unlatched position, crank mechanism 126 causes actuator rod 128 to move downwardly and causes actuator rod 130 to move upwardly.

Figure 9:
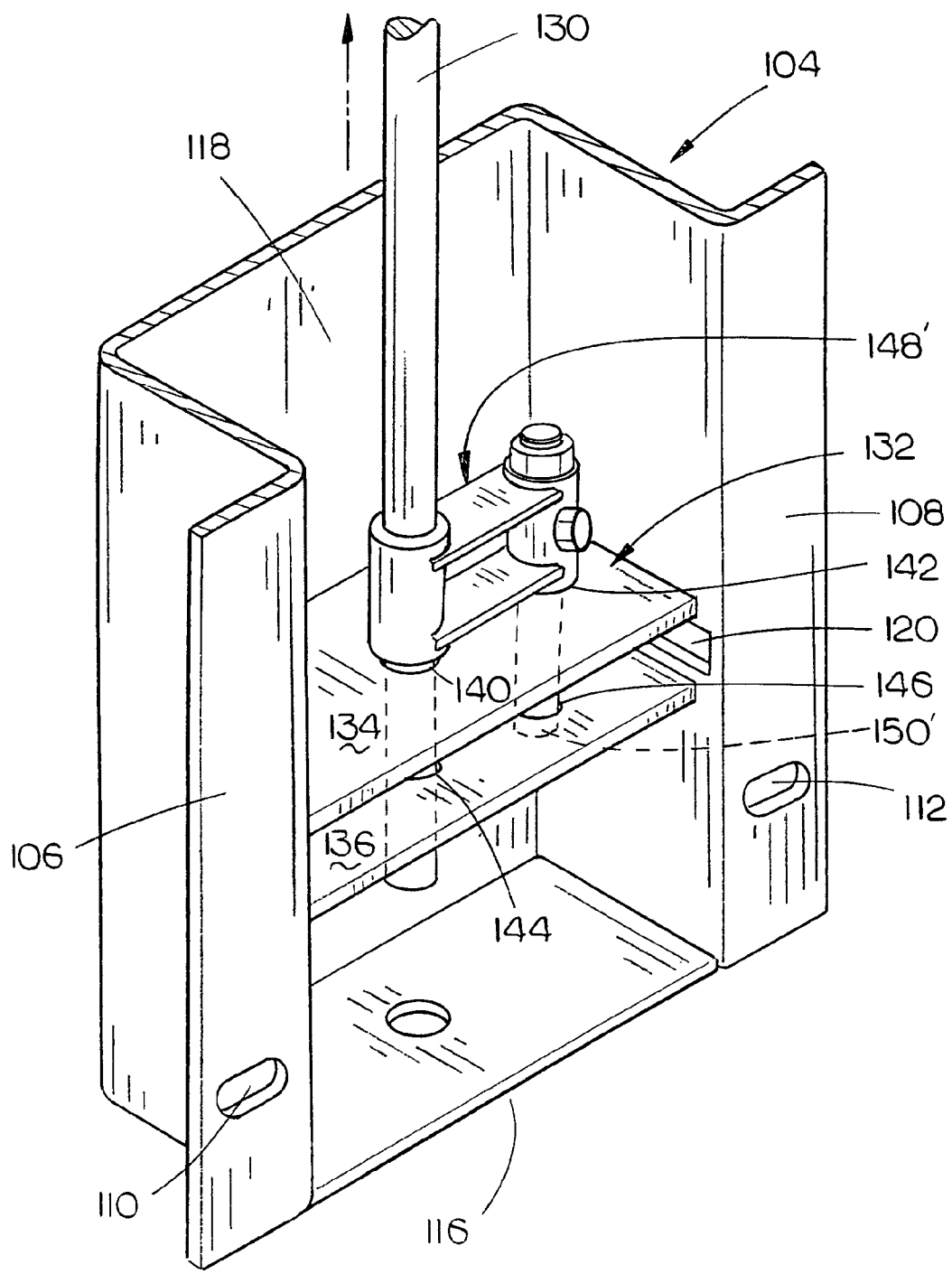
FIG. 9 is a partial perspective view of the lower portion of the housing positioned at the outside surface of the door.
Figure 10:
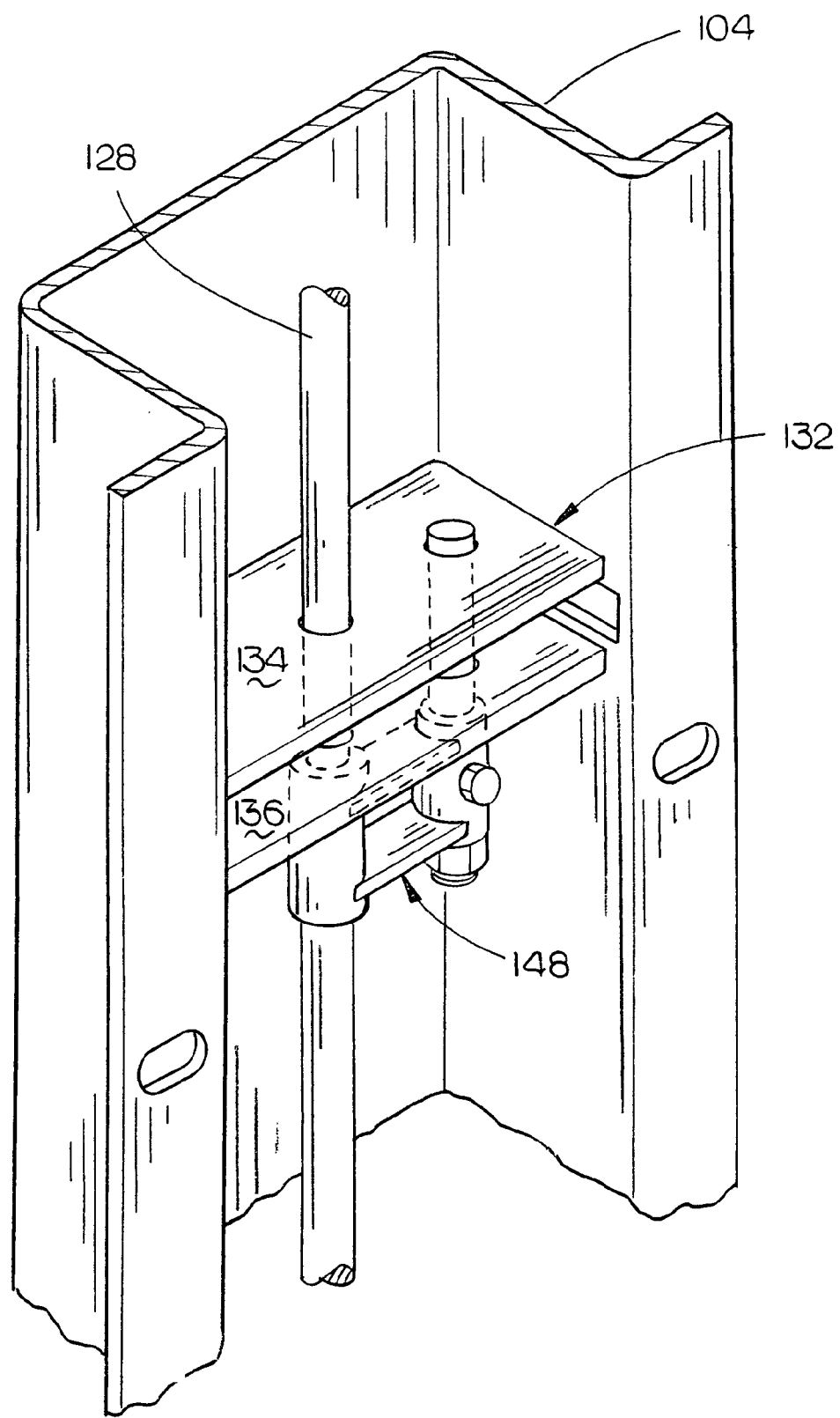
FIG. 10 is a partial perspective view of the portion of the housing and associated latching structure.

A plurality of vertically spaced-apart latch plate assemblies 132 are secured to housing 104 in compartment 118 by welding or the like with each assembly 132 including an upper latch plate 134 and a lower latch plate 136 which are vertically spaced apart. As seen in FIG. 9, upper latch plate 134 is positioned above the associated slot 120 and lower latch plate 136 is positioned below the associated slot 120. Each of the latch plates 134 in each of the latch plate assemblies 132 have a first opening 140 and a second opening 142 formed therein. Each of the latch plates 136 in each of the latch plate assemblies 132 have a first opening 144 and a second opening 146 formed therein. Openings 140 and 144 are vertically aligned and openings 142 and 146 are vertically aligned.

Actuator rod 128 movably extends through the openings 140 and 144 in those latch plate assemblies 132 which are positioned above crank mechanism 126 and actuator rod 130 movably extends through the openings 140 and 144 in those latch plate assemblies 132 which are positioned below crank mechanism 126.

A plurality of latch pin assemblies 148 are secured to actuator rod 128 in a vertically spaced-apart manner and have latch pins 150 extending upwardly therefrom which are received by the openings 146 and 142 of those latch pin assemblies 132 which are positioned above crank mechanism 126 when a latch handle 122 is moved from its unlatched position to its latched position.

A plurality of latch pin assemblies 148' are secured to actuator rod 130 in a vertically spaced-apart manner and have latch pins 150' extending downwardly therefrom which are received by the openings 142 and 146 of those latch pin assemblies 132 which are positioned below crank mechanism 126 when the latch handle 122 is moved from its unlatched position to its latched position. When the latches 98 are in their latched positions, the latch pins 150 and 150' also extend through the openings 100 in the latches 98 when the latch handle 122 is moved from its unlatched position to its latched position since the latches 98 are positioned between the upper and lower latch plates of the latch plate assemblies and the openings 100 are vertically aligned with the openings 142 and 146 of the latch plates 134 and 136 respectively.

The switchgear door latch system of this invention functions as follows. Assuming that the door 26 is in the open position and assuming that the angle member 88 with the latches 98 attached thereto is in the open or unlatched position and the latch handle 122 is in the unlatched position, the following steps take place. The door 26 is then moved from its open position to its closed position to close the door opening 27. The angle member 88 is then moved from its unlatched position to its latched position wherein the wall 90 of angle member 88 will be moved into engagement with the outside surface of the door 26, as illustrated in FIG. 11 which will cause the door 26 to move into engagement with the seal 42. At that time, the latches 98 have been received by the slots 120 in the housing 104. The latch handle 122 is then rotatably moved from its unlatched position to its latched position which will cause the actuator rod 128 to move upwardly so that the latch pins 150 will extend upwardly through the opening 146 in latch plate 136, through opening 100 in the associated latch 98 and through the opening 142 in the latch plate 132. At the same time, the actuator rod 130 will longitudinally moved downwardly so that the latch pins 150' extend downwardly through the openings 142 in the latch plates 134, extend through the opening 100 in the associated latch 98 and through the openings 150' in the latch plates 136. At that time, the door 26 will be latched in place and will prevent the door from moving to its open position should an arc-fault explosion occur within the enclosure. When one of the components of the system fails, it is not necessary to cut a hole in the door to repair the same since all the components of the system are located at the exterior side of the door 26. For example, if there should be a problem within the housing 104, the housing 104 may be removed from the door without the need of opening the door. The engagement of the latch pins with the latches and the engagement of the angle member 88 with the outer surface of the door ensures that the door will not open upon an arc-fault explosion occurring.

It can therefore be seen that a unique switchgear door latch system has been provided which accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
   a switchgear enclosure having a vertically disposed door opening formed in a wall thereof with the wall having an outer surface and with the door opening having an upper edge, a lower edge, a first side edge, and a second side edge;
   a plurality of first hinges;
   each of said first hinges including first and second parts pivotally joined together by a vertically disposed pivot pin;
   said plurality of first hinges having their first parts operatively secured to said wall, in a vertically spaced-apart manner, adjacent said first side edge of said door opening;
   a door having an upper end, a lower end, a first side end, a second side, an inner surface and an outer surface;
   said second parts of said first hinges being secured to said door at said first side thereof in a vertically spaced-apart manner whereby said door may be moved between a first closed position and a second open position with respect to the door opening;
   said door having a height and width greater than the height and width of said door opening so that said upper end, said lower end, said first side and said second side of said door, when in said closed position, are positioned adjacent said wall around said door opening;
   a plurality of second hinges;
   each of said second hinges having first and second parts pivotally joined together by a vertically disposed pivot pin;
   said first parts of said second hinges being operatively secured to said wall in a vertically spaced-apart manner laterally outwardly of said second side edge of said door opening;
   an elongated, vertically disposed angle member having first and second wall portions which are transversely disposed with respect to one another;
   said second parts of said second hinges being secured to said second wall portion of said angle member;
   a plurality of elongated, horizontally disposed door latches having inner and outer ends;
   said inner ends of said door latches being secured to said angle member in a vertically spaced-apart manner for movement therewith;
   at least one of said door latches having a handle associated therewith;
   each of said door latches having a latch pin opening formed therein outwardly of said inner end thereof;
   said angle member and said door latches being pivotally movable from a latched position to an unlatched position;
   an elongated vertically disposed door latch housing having upper and lower ends and including a channel-shaped portion having an outer wall having an upper end, a lower end, an inner side, an outer side, a first side wall, a second side wall, a top wall, a bottom wall, a first flange extending from said first side wall, and a second flange extending from said second side wall;
   said outer wall, first side wall, second side wall, top wall and bottom wall defining an interior compartment;
   said door latch housing being positioned at said outer side of said door and secured to said door laterally of said second side of said door by fasteners extending through said first and second flanges and into said door;
   a latch handle having a shaft extending therefrom;
   said latch handle being rotatably positioned at said outer side of said channel-shaped portion of said door latch housing so that said shaft extends therefrom into said interior compartment;
   said latch handle being selectively rotatably movable between latched and unlatched positions;
   a first elongated actuator rod, having first and second ends, movably positioned in said interior compartment;
   a second elongated actuator rod, having first and second ends, movably positioned in said interior compartment;
   said first end of said first actuator rod being operatively coupled to said shaft of said latch handle;
   said first actuator rod extending from said shaft of said latch handle towards said top wall of said channel-shaped portion of said door latch housing;
   said first end of said second actuator rod being operatively coupled to said shaft of said latch handle;
   said second actuator rod extending from said shaft of said latch handle towards said bottom wall of said door latch housing;
   the movement of said latch handle from its unlatched position to its latched position causing said first actuator rod to move upwardly and causing said second actuator rod to move downwardly;
   the movement of said latch handle from its latched position to its unlatched position causing said first actuator rod to move downwardly and causing said second actuator rod to move upwardly;
   a plurality of horizontally disposed first latch plate assemblies positioned in said interior compartment and secured to said channel-shaped portion of said door latch housing in a vertically spaced-apart manner above said shaft of said latch handle;
   each of said first latch plate assemblies having first and second openings formed therein;
   a plurality of horizontally disposed second latch plate assemblies positioned in said interior compartment and secured to said channel-shaped portion of said door latch housing in a vertically spaced-apart manner below said shaft of said latch handle;
   each of said second latch plate assemblies having first and second openings formed therein;
   said first actuator rod longitudinally movably extending through said first openings in said first latch plate assembly;
   said second actuator rod longitudinally movably extending through said first openings in said second latch plate assemblies;

a plurality of first latch pin assemblies secured to said first actuator rod for movement therewith said first latch pin assemblies being positioned below said first latch plate assemblies;

each of said first latch pin assemblies including a latch pin extending upwardly therefrom which is received by said second opening in the associated first latch plate assembly when said latch handle is moved from said unlatched position to said latched position;

a plurality of second latch pin assemblies secured to said second actuator rod for movement therewith with said second latch pin assemblies being positioned above said second latch plate assemblies;

each of said second latch pin assemblies including a latch pin extending downwardly therefrom which is received by said second opening in the associated second latch plate when said latch handle is moved from said unlatched position to said latched position;

said channel-shaped portion of said door latch housing having a plurality of slots formed therein which receive said door latches therein when said angle member and said door latches are pivotally moved to said latched position;

said latch pin openings in said door latches, when said angle member and said door latches are in said latched position, being vertically aligned with said second openings in said first and second latch plate assemblies, whereby said latch pins are received by said second openings in said latch plate assemblies when said latch handle is moved from its unlatched position to its latched position;

said first wall of said angle member being in engagement with said door when said door is in said closed position and said angle member and said door latches are in said latched position.

2. The combination of claim 1 wherein said each of said latch plate assemblies comprises first and second vertically spaced-apart latch plates with each of said latch plates having said first and second openings formed therein.

3. The combination of claim 1 wherein said latch pin openings in said latches are slot-like in configuration.

4. The combination of claim 1 wherein a seal means is secured to said wall adjacent said door opening.

* * * * *